United States Patent [19]

Endo et al.

[11] Patent Number: 4,762,810

[45] Date of Patent: Aug. 9, 1988

[54] METHOD FOR THE PREPARATION OF A SINTERED BODY OF SILICON CARBIDE

[75] Inventors: Morinobu Endo, Nagano; Minoru Takamizawa, Minoru Takamizawa; Tatsuhiko Hongu, Kanagawa; Akira Hayashida, Niigata; Nobuaki Urasato, Niigata; Hiromi Ohsaki, Niigata, all of Japan

[73] Assignee: Shin-Etsu Chemical Co., Ltd., Tokyo, Japan

[21] Appl. No.: 17,818

[22] Filed: Feb. 24, 1987

[30] Foreign Application Priority Data

Feb. 24, 1986 [JP] Japan .................................. 61-38877

[51] Int. Cl.⁴ ............................................. C04B 35/56
[52] U.S. Cl. ........................................ 501/88; 501/90; 501/91; 501/92
[58] Field of Search ...................... 501/89, 90, 91, 92, 501/88; 264/65

[56] References Cited

U.S. PATENT DOCUMENTS

| | | | |
|---|---|---|---|
| 4,179,299 | 12/1979 | Coppola et al. | 501/90 |
| 4,209,474 | 6/1980 | Prochazka | 501/92 |
| 4,649,002 | 3/1987 | Kim et al. | 264/65 |

Primary Examiner—William R. Dixon, Jr.
Assistant Examiner—Anthony Green
Attorney, Agent, or Firm—Hopgood, Calimafde, Kalil, Blaustein & Judlowe

[57] ABSTRACT

Sintered bodies of silicon carbide having remarkably increased volume resistivity and thermal conductivity can be obtained by heating a green body shaped of a fine silicon carbide powder admixed with boron or a boron compound, e.g. boron carbide, titanium boride and boron oxide, as a sintering aid at 1800° to 2200° C. in the presence of or in the vicinity of a shaped body of a powdery mixture of a fine silicon carbide powder admixed with boron nitride in the same furnace. The improvements in the volume resistivity and thermal conductivity of the sintered body are particularly remarkable when the fine silicon carbide powder is a pyrolysis product of a methyl hydrogen silane compound such as tetramethyl disilane.

2 Claims, No Drawings

METHOD FOR THE PREPARATION OF A SINTERED BODY OF SILICON CARBIDE

BACKGROUND OF THE INVENTION

The present invention relates to a method for the preparation of a sintered body of silicon carbide or, more particularly, to a method for the preparation of a sintered body of silicon carbide having excellent thermal conductivity and high electric insulation and useful as a material of substrates of integrated circuits and other electronic components.

Silicon carbide in the form of a sintered body is a material having various excellent properties such as heat resistance, wear resistance, mechanical strength, corrosion resistance and so on so that silicon carbide is highlighted in recent years as a material suitable for various applications. In particular, the high electric insulation and thermal conductivity of silicon carbide ensure the usefulness thereof as a material as the substrates of integrated circuits and other electronic components.

Technical difficulties are encountered, however, when further improvements are intended in the volume resistivity and thermal conductivity of sintered bodies of silicon carbide. Various attempts and proposals have been made hitherto in this regard including a method of admixing beryllium oxide to the silicon carbide powder prior to sintering. This method, however, is not practical in respect of the safety problem of workers due to the strong toxicity of beryllium compounds. In addition, beryllium oxide has little effect as a sintering aid so that the silicon carbide powder admixed with beryllium oxide can be shaped and fully sintered into a high-density sintered body only by use of a hot press because no satisfactory sintered body can be prepared by sintering under normal pressure. Moreover, the supply of beryllium compounds is relatively small and unstable in the world due to the scantiness of the resources if not to mention the expensiveness. Finally, sintered bodies of silicon carbide must be sliced and lapped in the manufacturing process of substrates for integrated circuits by using expensive tools so that the cost for the production of finished products is unavoidably increased so much.

Most of ceramic substrates for integrated circuits are made from aluminum oxide in view of the inexpensiveness thereof. Aluminum oxide-made ceramic substrates are disadvantageous, however, in respect of the low thermal conductivity of 20W/m.K and the considerably larger coefficient of thermal expansion of $8 \times 10^{-6}/°C$. than the coefficient of thermal expansion $3.5 \times 10^{-6}/°C$. of single crystals of semiconductor silicon. Accordingly, it has been eagerly desired to develop a material superior to aluminum oxide in respect of heat conduction and heat radiation. Besides silicon carbide, aluminum nitride is one of the candidate materials for the substrates of integrated circuits but the application fields of aluminum nitride-made substrates are disadvantageously limited due to the poor chemical resistance in addition to the inherently low thermal conductivity.

SUMMARY OF THE INVENTION

Accordingly, the present invention provides a novel and improved method for the preparation of a sintered body of silicon carbide having excellent properties in respect of the high electric insulation and thermal conductivity without the above described problems and disadvantages in the use of beryllium oxide as an additive to the silicon carbide powder to be sintered.

Thus, the method of the present invention for the preparation of a sintered body of silicon carbide comprises:

(a) admixing a fine powder of silicon carbide with boron or a boron compound such as boron carbide, titanium boride and boron oxide in an amount in the range from 0.1 to 5% by weight as boron to give a powdery mixture;

(b) shaping the powdery mixture by compression to give a green body of silicon carbide; and (c) heating the green body of silicon carbide at a temperature of, for example, 1800° to 2200° C. in a furnace in the presence of a powdery mixture or, preferably, a shaped body thereof composed of a fine powder of silicon carbide admixed with 0.01 to 50% by weight of boron nitride.

The above described inventive method is particularly effective when the fine powder of silicon carbide is a product of the vapor-phase pyrolysis of a methyl hydrogen silane compound.

DETAILED DESCRIPTION OF THE PREFERRED EMBODIMENTS

As is understood from the above given summary of the invention, the characteristic features of the inventive method consist in admixing a fine powder of silicon carbide with boron or a boron compound as a sintering aid and sintering of the green body shaped of such a powdery mixture in the presence of a mixture of powdery silicon carbide and boron nitride. This method is so effective that the sintered body of silicon carbide obtained by this method has high electric insulation and thermal conductivity. For example, sintered bodies of silicon carbide prepared by the inventive method may have a volume resistivity as high as $10^{12}$ to $10^{13}$ ohm.cm and a coefficient of thermal conductivity as high as 150 to 220W/m.K. The sintering procedure in this case can be performed under normal pressure even without admixture of a poisonous sintering aid so that a large quantity of desired sintered bodies of silicon carbide can be manufactured easily with low costs.

The base starting material in the inventive method is a fine powder of silicon carbide. The particle size of the silicon carbide powder should preferably be in the range from 0.01 to 3 μm. When the particle size distribution of the silicon carbide powder is too coarse, sufficient effects of sintering can be obtained only with some difficulties. Further, the silicon carbide powder should have a purity as high as possible. In these regards, silicon carbide powders suitable for use in the inventive method can be obtained by the vapor-phase pyrolytic reaction of a distilled and purified methyl hydrogen silane compound represented by the general formula $(CH_3)_aSi_bH_c$, in which b is 1,2 or 3, $a<2b+1$ and $1<c<2b+1$ with the proviso that $a+c=2b+2$, such as 1,1,2,2-tetramethyl disilane at a temperature in the range from 750° to 1600° C. according to the procedure described in Japanese Patent Kokai No. 60-46912. The silicon carbide particles formed by the vapor-phase pyrolysis of a methyl hydrogen silane have a very fine spherical configuration of a diameter in the range from 0.01 to 1 μm and have a crystallographic structure of β-SiC. Each particle is composed of extremely fine crystallites having a diameter of 5 nm or smaller and the surface of the particles have high activity. Accordingly, no further pulverization is necessary for the silicon carbide powder formed by the vapor-phase pyrolysis of the silane compound. In addition, the silicon carbide powder prepared by this method has an extremely high purity as a result of the high purity of the starting silane compound.

In the first step of the inventive method, the above mentioned fine powder of silicon carbide is admixed with boron or a boron compound as a sintering aid to give a powdery mixture to be shaped into a green body. Boron and boron compounds are known materials as a sintering aid of silicon carbide including boron carbide, titanium boride, boron oxide and the like. The amount of boron or a boron compound admixed with the silicon carbide powder should be in the range from 0.1 to 5% by weight as boron based on the silicon carbide powder. When the amount thereof is too small, the effect thereof as a sintering aid is insufficient so that sintered bodies having a sufficiently high density can hardly be obtained. When the amount of the sintering aid is too large, on the other hand, the sintered body thus obtained would have a somewhat decreased volume resistivity although the sintered body may have a sufficiently high density. The powdery mixture of the fine silicon carbide powder and boron or a boron compound is then shaped by compression molding into a green body of a desired form to be subjected to sintering.

Characteristically, the sintering procedure of the thus shaped green body is performed in the presence of a powdery mixture or, preferably, a shaped body thereof composed of a fine powder of silicon carbide admixed with from 0.01 to 50% by weight of boron nitride. The boron nitride admixed with the silicon carbide powder has an effect to impart the desired sintered body of silicon carbide with a further increased resistivity. The boron nitride may be hexagonal or cubic in the crystallographic structure without particular difference in the effectiveness between these two crystalline forms. In view of the object of admixing the boron nitride to increase the electric resistivity of the sintered body of silicon carbide, the purity of the boron nitride also should be as high as possible or, desirably, at least 99%. The effect thereof to increase the resistivity of the sintered body is best exhibited when the amount of the boron nitride is in the range from 0.01 to 50% by weight based on the silicon carbide powder. The mixture of the silicon carbide powder and boron nitride may be used either in the form of the powdery mixture as such or, preferably due to the absence of the danger of scattering, in the form of a shaped body prepared by compression molding.

The most surprising discovery from which the present invention has been completed is that the volume resistivity and thermal conductivity of the sintered body of silicon carbide can be remarkably increased when the green body of the fine silicon carbide powder admixed with boron or a boron compound is sintered in the presence of or in the vicinity of a mixture of a silicon carbide powder and boron nitride although the mechanism leading to this phenomenon is quite unclear. Namely, the shaped body of the powdery mixture of silicon carbide powder and boron nitride should be present in the same furnace in which the green body of the silicon carbide powder admixed with boron or a boron compound as a sintering aid is heated for sintering. Further, it is desirable that they are placed as closely as possible in the furnace or they are heated at substantially the same temperature in order to obtain more fully exhibited advantageous effects of the inventive method. Sintering of the green body should be performed in vacuum or in an atmosphere of an inert gas such as nitrogen, helium, argon and the like. Since the green body is shaped of a highly active fine silicon carbide powder admixed with boron or a boron compound as a sintering aid, the green body can be sintered quite satisfactorily even under normal pressure without using a hot press or other special means. The temperature for sintering should be in the range from 1800° C. to 2200° C. When the temperature is lower than 1800° C., sintering cannot proceed to a full extent so that the resultant sintered body would not have a sufficiently high density. When the temperature is higher than 2200° C., on the other hand, the crystallites of the silicon carbide particles may cause extraordinary grain growth resulting in decrease of the volume resistivity of the sintered body as well as decrease in the mechanical strength thereof.

The method of the present invention is so effective that the sintered body of silicon carbide obtained by the inventive method has a very high volume resistivity of $10^{12}$ to $10^{13}$ ohm.cm, which is much higher than the value of $10^4$ to $10^6$ ohm.cm in the sintered bodies of silicon carbide prepared by the conventional method. Further, the thermal conductivity of the sintered body prepared according to the inventive method can be as high as 150 to 220W/m.K. These excellent properties ensure usefulness of the sintered body of silicon carbide prepared by the inventive method as a material for the substrates of integrated circuits and other electronic components.

In the following, the method of the present invention is described in more detail by way of examples. The values of the thermal conductivity given in the examples were measured by the xenon flash method.

EXAMPLE 1.

A quartz glass-made reactor tube having an inner diameter of 50 mm and a length of 1000 mm was heated at 1200° C. in an electric furnace of upright tubular type. A gaseous mixture of hydrogen gas containing 5% by volume of tetramethyl disilane $(CH_3)_4Si_2H_2$ was continuously introduced into the reactor tube at a rate of 1000 ml/minute so that the silane compound was pyrolyzed therein to form extremely fine particles of silicon carbide having an average particle diameter of about 0.2 $\mu$m and a specific surface area of 37.3 m$^2$/g. X-ray studies of the particles indicated that the crystallites therein had a diameter of about 2.5 nm.

A powdery mixture prepared by uniformly blending 4.955 g of the above obtained fine silicon carbide powder and 0.045 g of boron was shaped by compression molding in a metal mold into a disc having a diameter of 30 mm and a thickness of 3 mm followed by further compression in a rubber press under a pressure of 1500 kg/cm$^2$. This disc-like body is referred to as the shaped body A hereinbelow. Five of the shaped body A were prepared in the above described manner.

Separately, another powdery mixture of 15 g of the same silicon carbide powder as used above and 3.75 g of boron nitride was shaped by compression molding into a disc of 30 mm diameter and 3 mm thickness, which is referred to as the shaped body B hereinbelow. Five of the shaped body B were prepared in this manner.

Each five pieces of the shaped bodies A and B were placed alternately in an electric furnace for sintering and heated at 2000° C. for 30 minutes in an atmosphere of argon gas under atmospheric pressure. The results were that, while the shaped bodies B could not be sintered, the shaped bodies A were converted each into a dense sintered body. After grinding of the surface, each of these sintered shaped bodies No. 1 to No. 5 was subjected to the measurement of the density, volume resistivity and coefficient of thermal conductivity to give the results shown in Table 1 below

EXAMPLES 2 TO 5 AND COMPARATIVE EXAMPLE 1.

Sintered bodies of silicon carbide were prepared in the same manner as in Example 1 except that the shaped bodies B were prepared of a powdery mixture of silicon carbide and boron nitride in which the content of boron nitride was as indicated in Table 2 below which also includes the density, volume resistivity and thermal conductivity of the sintered bodies.

TABLE 1

| Shaped body A No. | Density, g/cm$^3$ | Volume resistivity, ohm · cm | Thermal conductivity, W/m · K |
|---|---|---|---|
| 1 | 3.08 | $1.0 \times 10^{12}$ | 157 |
| 2 | 3.10 | $1.1 \times 10^{12}$ | 168 |
| 3 | 3.17 | $4.1 \times 10^{13}$ | 194 |
| 4 | 3.15 | $4.7 \times 10^{13}$ | 220 |
| 5 | 3.12 | $2.3 \times 10^{12}$ | 182 |

TABLE 2

| | Boron nitride added, % by weight | Density, g/cm$^3$ | Volume resistivity, ohm · cm | Thermal conductivity, W/m · K |
|---|---|---|---|---|
| Example 2 | 0.1 | 3.14 | $7.3 \times 10^{11}$ | 200 |
| Example 3 | 0.5 | 3.17 | $5.2 \times 10^{12}$ | 209 |
| Example 4 | 2.0 | 3.16 | $8.5 \times 10^{12}$ | 210 |
| Example 5 | 20.0 | 3.17 | $2.0 \times 10^{13}$ | 225 |
| Comparative Example 1 | 100.0 | 3.12 | $2.0 \times 10^{10}$ | 188 |

EXAMPLES 7 TO 13.

Sintered bodies of silicon carbide were prepared in the same manner as in Example 1 except that the amount of the boron as the sintering aid in the powdery mixture for the shaped bodies A was as indicated in Table 3 below or boron was replaced with a boron compound shown in Table 3 in an amount also shown in the same table, which also includes the density, volume resistivity and thermal conductivity of the sintered bodies of silicon carbide.

TABLE 3

| Example No. | Sintering aid Type | Amount added g | Amount added % by weight, as B | Density g/cm$^3$ | Volume resistivity, ohm · cm | Thermal conductivity, W/m · K |
|---|---|---|---|---|---|---|
| 7 | Boron | 0.015 | 0.1 | 3.02 | $8.5 \times 10^{10}$ | 140 |
| 8 | Boron | 0.045 | 0.3 | 3.18 | $2.3 \times 10^{13}$ | 230 |
| 9 | Boron | 0.150 | 1.0 | 3.19 | $1.8 \times 10^{12}$ | 217 |
| 10 | Boron | 0.375 | 2.5 | 3.12 | $7.0 \times 10^{10}$ | 200 |
| 11 | Boron carbide | 0.057 | 0.3 | 3.16 | $3.5 \times 10^{8}$ | 210 |
| 12 | Titanium boride | 0.143 | 0.3 | 3.02 | $8.9 \times 10^{10}$ | 182 |
| 13 | Boron oxide | 0.143 | 0.3 | 3.10 | $9.2 \times 10^{10}$ | 185 |

EXAMPLE 14.

Five sintered bodies No. 1 to No. 5 of silicon carbide were prepared in the same manner as in Example 1 except that five shaped bodies A were placed around a shaped body B at the center of the furnace bed. Table 4 below shows the density, volume resistivity and thermal conductivity of each of the sintered bodies.

TABLE 4

| Shaped body No. | Density, g/cm$^3$ | Volume resistivity, ohm · cm | Thermal conductivity, W/m · K |
|---|---|---|---|
| 1 | 3.10 | $3.1 \times 10^{12}$ | 172 |
| 2 | 3.11 | $2.5 \times 10^{12}$ | 165 |
| 3 | 3.16 | $8.2 \times 10^{13}$ | 208 |
| 4 | 3.12 | $9.1 \times 10^{12}$ | 178 |
| 5 | 3.10 | $3.8 \times 10^{12}$ | 153 |

EXAMPLE 15

Five sintered bodies No. 1 to No. 5 of silicon carbide were prepared in the same manner as in Example 1 except that a graphitemade double-deck table was installed in the sintering furnace and five shaped bodies A and five shaped bodies B were mounted on the lower and upper decks, respectively. Table 5 given below shows the density, volume resistivity and thermal conductivity of each of the sintered bodies.

TABLE 5

| Shaped body A No. | Density, g/cm$^3$ | Volume resistivity, ohm · cm | Thermal conductivity, W/m · K |
|---|---|---|---|
| 1 | 3.12 | $4.2 \times 10^{12}$ | 164 |
| 2 | 3.16 | $6.1 \times 10^{12}$ | 179 |
| 3 | 3.13 | $2.8 \times 10^{13}$ | 205 |
| 4 | 3.10 | $8.6 \times 10^{11}$ | 196 |
| 5 | 3.12 | $7.9 \times 10^{11}$ | 168 |

EXAMPLES 16 AND 17.

Sintered bodies of silicon carbide were prepared in the same manner as in Example 1 except that the shaped bodies A were prepared of a powdery mixture composed of 15 g of a commercial product of β-SiC silicon carbide powder having a specific surface area of 16 m$^2$/g (Example 16) or an α-SiC silicon carbide powder having a specific surface area of 11 m$^2$/g (Example 17) admixed with a combination of 0.075 g of boron and 0.075 g of carbon as the sintering aid. Table 6 given below shows the density, volume resistivity and thermal conductivity of each of the sintered bodies.

TABLE 6

| Example No. | Density, g/cm$^3$ | Volume resistivity, ohm · cm | Thermal conductivity, W/m · K |
| --- | --- | --- | --- |
| 16 | 3.05 | 6.8 × 10$^8$ | 153 |
| 17 | 3.01 | 6.1 × 10$^8$ | 132 |

COMPARATIVE EXAMPLE 2.

Sintered bodies of silicon carbide were prepared in the same manner as in Example 1 except that the shaped bodies B were entirely omitted in the sintering procedure. The results were that the sintered bodies had a density of 3.12 g/cm$^3$, volume resistivity of 4.5×10$^5$ ohm.cm and thermal conductivity of 136W/m.K on an average indicating that the presence of the shaped bodies B in the sintering process was particularly effective in increasing the volume resistivity of the sintered bodies although the influence thereof on the density of the sintered bodies was relatively small.

COMPARATIVE EXAMPLE 3.

Sintered bodies of silicon carbide were prepared in the same manner as in Example 16 except that the shaped bodies B were entirely omitted in the sintering procedure. The results were that the sintered bodies had a density of 3.11 g/cm$^3$, volume resistivity of 3.5×10$^3$ ohm.cm and thermal conductivity of 120W/m.K on an average indicating that the presence of the shaped bodies B was very effective in increasing the volume resistivity and thermal conductivity of the sintered bodies although the influence thereof on the density of the sintered bodies was small.

What is claimed is:

1. A method for the preparation of a sintered body of silicon carbide exhibiting extremely high volume resistivity and thermal conductivity and high density, which comprises the steps of:
    (a) admixing a fine powder of silicon carbide with boron or a boron compound selected from the group consisting of boron carbide, titanium boride and boron oxide in an amount in the range from 0.1 to 5% by weight as boron based on the silicon carbide powder to give a powdery mixture;
    (b) shaping the powdery mixture by compression to give a first green body of silicon carbide; and
    (c) sintering the first green body at a temperature in the range from 1800° to 2200° C. in the same furnace, at the same time and at substantially the same temperature as a second shaped body or powdery mixture composed of a fine powder of silicon carbide admixed with boron nitride in an amount in the range from 0.01 to 50% by weight, whereby the presence of the second shaped body or powdery mixture of boron nitride and silicon carbide during sintering has the effect of imparting extremely high volume resistivity and thermal conductivity and high density to the sintered first body of silicon carbide.

2. The method for the preparation of a sintered body fo silicon carbide as claimed in claim 1 wherein the fine powder of silicon carbide is a pyrolysis product of a methyl hydrogen silane compound.

* * * * *